(12) United States Patent
Cusey et al.

(10) Patent No.: US 6,986,057 B1
(45) Date of Patent: Jan. 10, 2006

(54) SECURITY DEVICE AND METHOD

(75) Inventors: James P. Cusey, McKinney, TX (US); Hal Kurkowski, Dallas, TX (US)

(73) Assignee: Dallas Semiconductor Corporation, Dallas, TX (US)

( * ) Notice: Subject to any disclaimer, the term of this patent is extended or adjusted under 35 U.S.C. 154(b) by 890 days.

(21) Appl. No.: 09/644,031

(22) Filed: Aug. 22, 2000

Related U.S. Application Data

(60) Provisional application No. 60/223,467, filed on Aug. 7, 2000.

(51) Int. Cl.
*H04L 9/00* (2006.01)
*H04L 9/32* (2006.01)
*H04K 1/00* (2006.01)
*G06F 11/30* (2006.01)
*G06F 12/14* (2006.01)

(52) U.S. Cl. .................. 713/200; 713/161; 713/189
(58) Field of Classification Search ................ 713/200, 713/189, 161; 380/23
See application file for complete search history.

(56) References Cited

U.S. PATENT DOCUMENTS

| | | | | |
|---|---|---|---|---|
| 4,471,216 A | * | 9/1984 | Herve ..................... | 235/380 |
| 4,549,075 A | | 10/1985 | Saada et al. ............. | 235/380 |
| 4,906,828 A | * | 3/1990 | Halpern .................. | 235/379 |
| 4,961,088 A | | 10/1990 | Gilliland et al. | |
| 5,049,898 A | | 9/1991 | Arthur et al. | |
| 5,193,144 A | * | 3/1993 | Moseley et al. ........... | 380/23 |
| 5,272,503 A | | 12/1993 | LeSueur et al. | |
| 5,283,613 A | | 2/1994 | Midgley, Sr. | |
| 5,491,540 A | | 2/1996 | Hirst | |
| 5,495,098 A | * | 2/1996 | Pailles et al. ............. | 235/492 |
| 5,699,091 A | | 12/1997 | Bullock et al. | |
| 5,739,511 A | * | 4/1998 | Pedersen ................. | 235/380 |
| 5,812,156 A | * | 9/1998 | Bullock et al. ........... | 347/19 |
| 5,835,817 A | | 11/1998 | Bullock et al. | |
| 5,907,832 A | * | 5/1999 | Pieterse et al. ........... | 705/39 |
| 5,917,421 A | * | 6/1999 | Saunders ................. | 340/5.41 |
| 6,039,430 A | * | 3/2000 | Helterline et al. ......... | 347/19 |
| 6,494,562 B1 | * | 12/2002 | Walker et al. ............ | 347/32 |
| 6,738,903 B1 | * | 5/2004 | Haines ................... | 713/168 |

FOREIGN PATENT DOCUMENTS

DE    4138861 A1    10/1992

(Continued)

OTHER PUBLICATIONS

Bruce Schneier, Applied Cryptography, 1996, John Wiley & Sons, Inc., pp. 442-445.*

(Continued)

*Primary Examiner*—Gilberto Barrón, Jr.
*Assistant Examiner*—Benjamin E. Lanier
(74) *Attorney, Agent, or Firm*—Jenkens & Gilchrist

(57) ABSTRACT

A security device is disclosed. In one embodiment, the security device includes a memory device comprising having a first memory portion configured to store a device ID; and a second memory portion configured to store a device secret. The security device further includes a processor connected to the memory device wherein the processor is configured to read the stored device ID from the first memory portion and the stored device secret from the second memory portion and perform a nonreversible computation using the stored device ID, the stored device secret, and a challenge as seeds. Additionally, the security device includes a communication circuit connected to the processor, the communication circuit configured to receive the challenge from a host device and to communicate a result of the nonreversible computation performed by the processor.

26 Claims, 13 Drawing Sheets

FOREIGN PATENT DOCUMENTS

| | | |
|---|---|---|
| DE | 19523466 | 3/1997 |
| EP | 0 028965 A1 | 5/1981 |
| EP | 0 427465 A2 | 5/1991 |
| EP | 0 621570 A1 | 10/1994 |
| EP | 637004 A1 * | 2/1995 |
| WO | WO 90/00974 | 2/1990 |
| WO | WO 97/22091 | 6/1997 |
| WO | WO 97/22093 | 6/1997 |

OTHER PUBLICATIONS

Laurianne McLaughlin, After ElcomSoft: DMCA Still Worries Developers, Reserchers, Mar./Apr. 2003, IEEE, pp. 86-89.*

* cited by examiner

Data Page 0

Data Page 1

Data Page 2

Data Page 3

Data Page 4

Data Page 5

Data Page 6

*FIG. 3c*

SECURITY DEVICE AND METHOD

Priority is hereby claimed from Provisional Application No. 60/223,467, entitled AUTOMATIC INFORMATION VERIFICATION SYSTEM AND METHOD, filed on Aug. 7, 2000. This Provisional Application is incorporated by reference.

RELATED APPLICATIONS/PATENTS

The following commonly owned and assigned United States patents are incorporated by reference:

| | |
|---|---|
| 5,306,961 | Low-power integrated circuit with selectable battery modes |
| 5,679,944 | Potable electronic module having EPROM memory, systems and processes |
| 5,764,888 | Electronic micro identification circuit that is inherently bonded to someone or something |
| 5,831,827 | Token shaped module for housing an electronic circuit |
| 5,832,207 | Secure module with microprocessor and co-processor |
| 5,940,510 | Transfer of valuable information between a secure module and another module |
| 5,949,880 | Transfer of valuable information between a secure module and another module |
| 5,978,927 | Method and system for measuring a maximum and minimum response time of a plurality of devices on a data bus and adapting the timing of read and write time slots |
| 5,994,770 | Portable electronic data carrier |
| 5,998,858 | Microcircuit with memory that is protected by both hardware and software |
| 6,016,255 | Portable data carrier mounting system |

FIELD OF THE INVENTION

The present invention relates to automatic information systems and methods and in particular, but not by way of limitation, to systems and methods for positively identifying a device/user and verifying the integrity of relevant data associated with the device/user.

BACKGROUND OF THE INVENTION

With the public's ever increasing reliance upon electronic data, the integrity of that data is becoming extremely critical. Many present day systems attempt to guarantee the integrity of such data through encryption and complicated monitoring means. Although these systems are generally effective, they are often expensive and unnecessary in that they consume too much energy and/or use too many processor cycles. Additionally, those systems that include encryption technology often face export restrictions that delay or prevent the widespread proliferation of a developed technology.

For many applications, the secrecy of the data may not be as important as the integrity of the data or may not be important at all. That is, in some situations the data can be known to the public but should not be alterable by the public. For example, the fact that $10 is stored on a transit card is not important. The public can know this fact without any harm. However, significant harm will occur if the transit card is fraudulently changed to show a value of $100 dollars rather than $10.

Accordingly, a device and method are needed that store electronic data, guarantee the integrity of that electronic data, and guarantee the integrity of any changes to that electronic data in an efficient manner. Additionally, a device and method are needed for overcoming the other problems presently associated with securely storing and transmitting electronic data.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

FIG. 3C illustrates one embodiment of the data page portion of the memory component shown in FIG. 3B;

DETAILED DESCRIPTION

Figure 1:
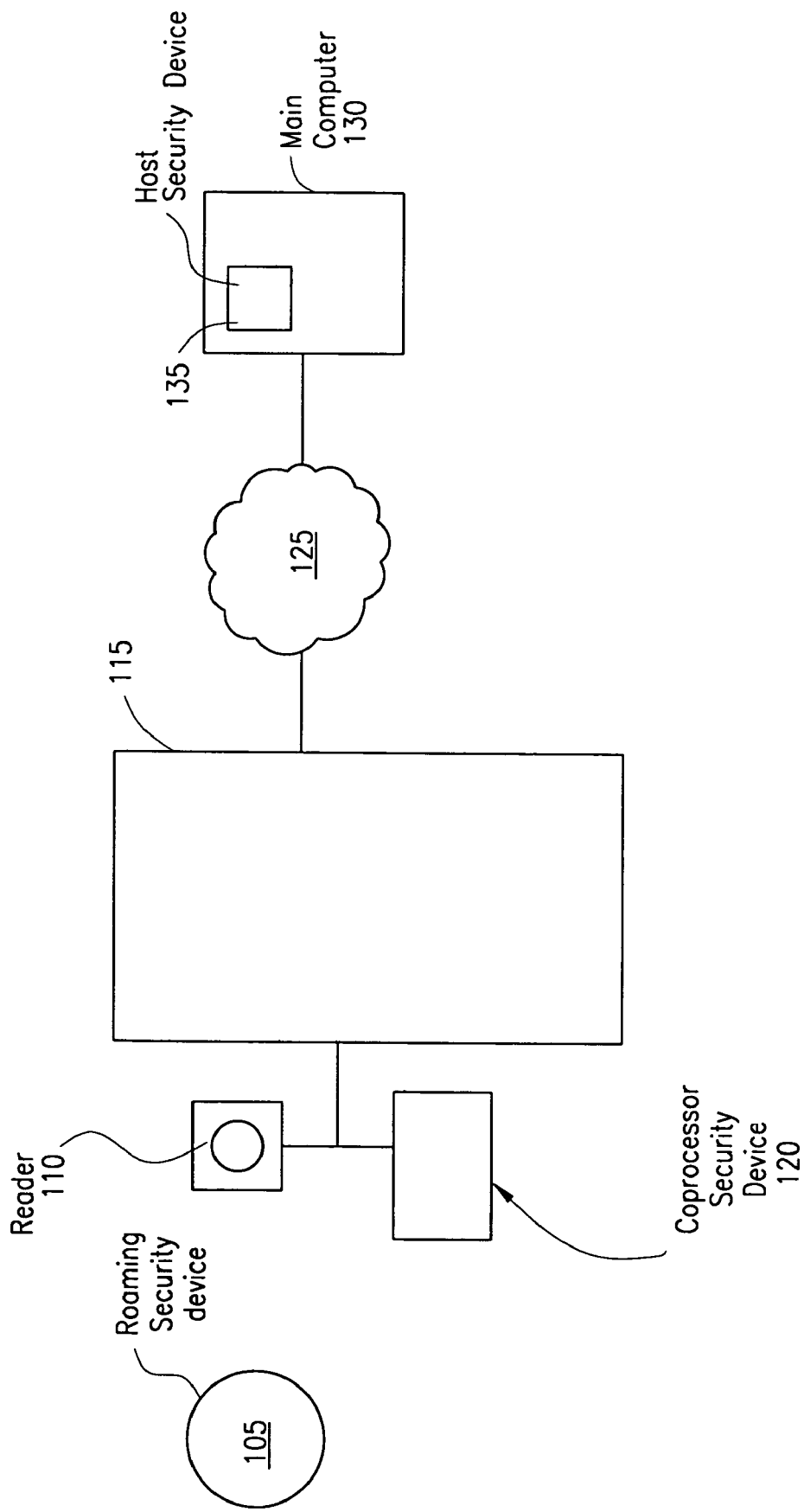
FIG. 1 illustrates one implementation of the present invention that utilizes a roaming security device.

Although the present invention is open to various modifications and alternative constructions, a preferred exemplary embodiment that is shown in the drawings is described herein in detail. It is to be understood, however, that there is no intention to limit the invention to the particular forms and/or step sequences disclosed. One skilled in the art can recognize that there are numerous modifications, equivalences and alternative constructions that fall within the spirit and scope of the invention as expressed in the claims.

Referring now to FIG. 1, there is illustrated an overview of one implementation of the present invention that utilizes a roaming security device 105. The roaming security device 105 can be associated with a person (e.g., key chain, ID card, jewelry, etc.) or a device (e.g., furniture, printer, printer cartridge, etc.) and can be configured to securely store data. Additionally, the roaming security device can be configured to securely interface with a reader 110, which can be for example, at or in a host device 115 such as a vending machine, toll booth, printer, computer system, security door, etc.

Because the roaming security device 105 can carry valuable data such as monetary value, it is important that any data transferred between the roaming security device 105 and the host device 115 be protected against alterations. In one embodiment, the data is encrypted prior to transfer between the roaming security device 105 and the host device 115. In the preferred embodiment, however, the data is used (along with secret data known only to the roaming security device 105 and the coprocessor security device 120) to seed a nonreversible algorithm, such as the SHA-1 algorithm. (In this context, a nonreversible algorithm is intended to refer to an algorithm that produces a result, wherein the input to the algorithm is extremely difficult or impossible to determine from the result.) The result of this algorithm is sent along with the associated data—but not the secret—from the roaming security device 105 to the coprocessor security device 120. The coprocessor security device 120, which may or may not be the same type of device as the remote security device 105, can then perform the same hashing algorithm using the received data and the locally stored secret. If the result computed by the coprocessor security device 120 matches the result computed by the roaming security device 105, then the roaming security device 105 is likely legitimate and the data contained therein valid.

As can be appreciated by those skilled in the art, the host device 115 can take the form of most any device both portable and stationary. Additionally, the reader within the host device 115 can operate in a variety of ways to read data from the roaming security device 105 including, but not limited to, direct contact transfer, proximity transfer, and single wire protocol transfers.

Furthermore, in one embodiment, the host device 115 is connected through a network 125, or otherwise, to a main computer 130. This main computer 130 can collect transaction information or monitor the host device 115. To guarantee the integrity of data transferred between the host device 115 and the main computer 130, a security device 135 can be incorporated into the main computer 130. The coprocessor security device 120, in this embodiment, acts like a roaming security device in its interaction with the host computer's security device 135.

Figure 2B:
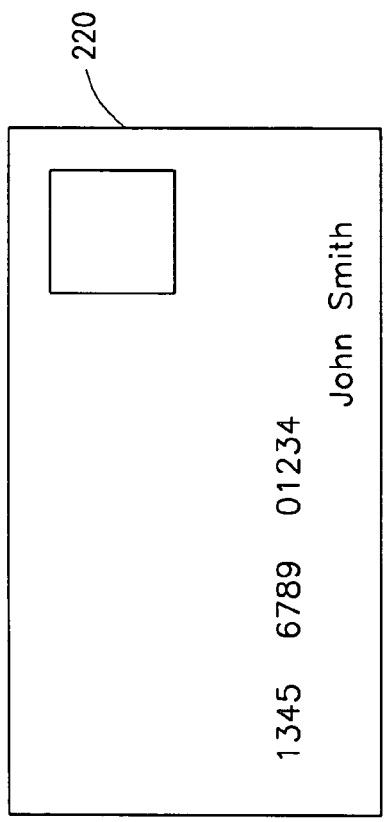
FIGS. 2A and 2B illustrate two different form factors into which a security device can be incorporated.
Figure 2A:
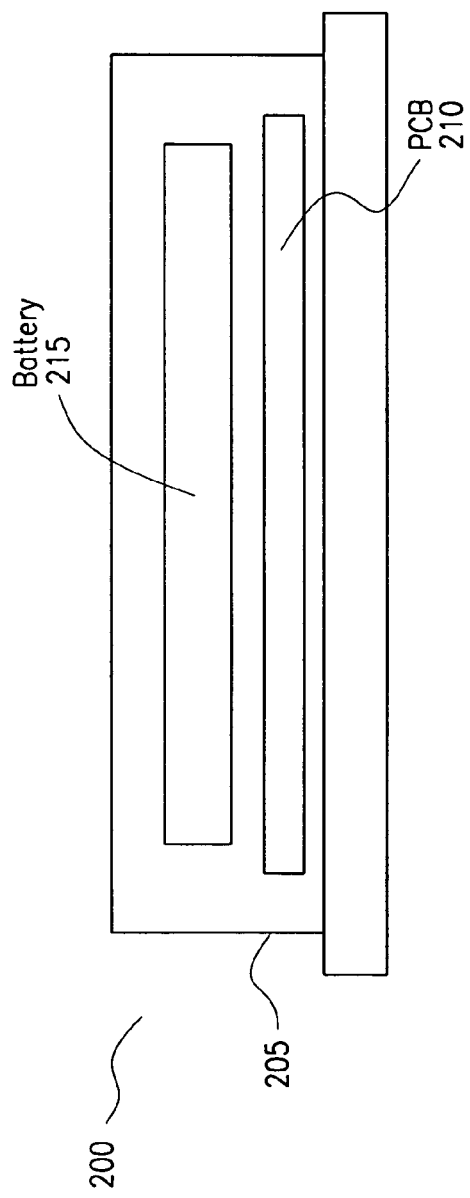

Referring now to FIGS. 2A and 2B, there are illustrated two of the different form factors into which a security device can be incorporated. FIG. 2A, for example, illustrates a token form factor 200 for a security device. This form factor consists of a sealed metal housing 205 that encases a printed circuit board (PCB) 210 and a battery 215. (This form factor is based upon Dallas Semiconductor's I-button and is described in, for example, U.S. Pat. No. 5,994,770 titled *Portable Electronic Data Carrier*.) Any attempt to access the circuitry on the PCB 210 will likely result in the destruction of any data stored thereon. FIG. 2B, on the other hand, illustrates a security device incorporated into a card 220 such as a credit/ATM card. One skilled in the art, however, can readily recognize that the security device can be incorporated into other form factors and, moreover, that a single system can utilize more than one form factor. For example, the roaming security device 105 shown in FIG. 1 could be in a card form factor, and the coprocessor security device 120 could be in a token form factor. Further, a simple mounting of the device as a circuit board can be done in lower risk situations.

Figure 3A:
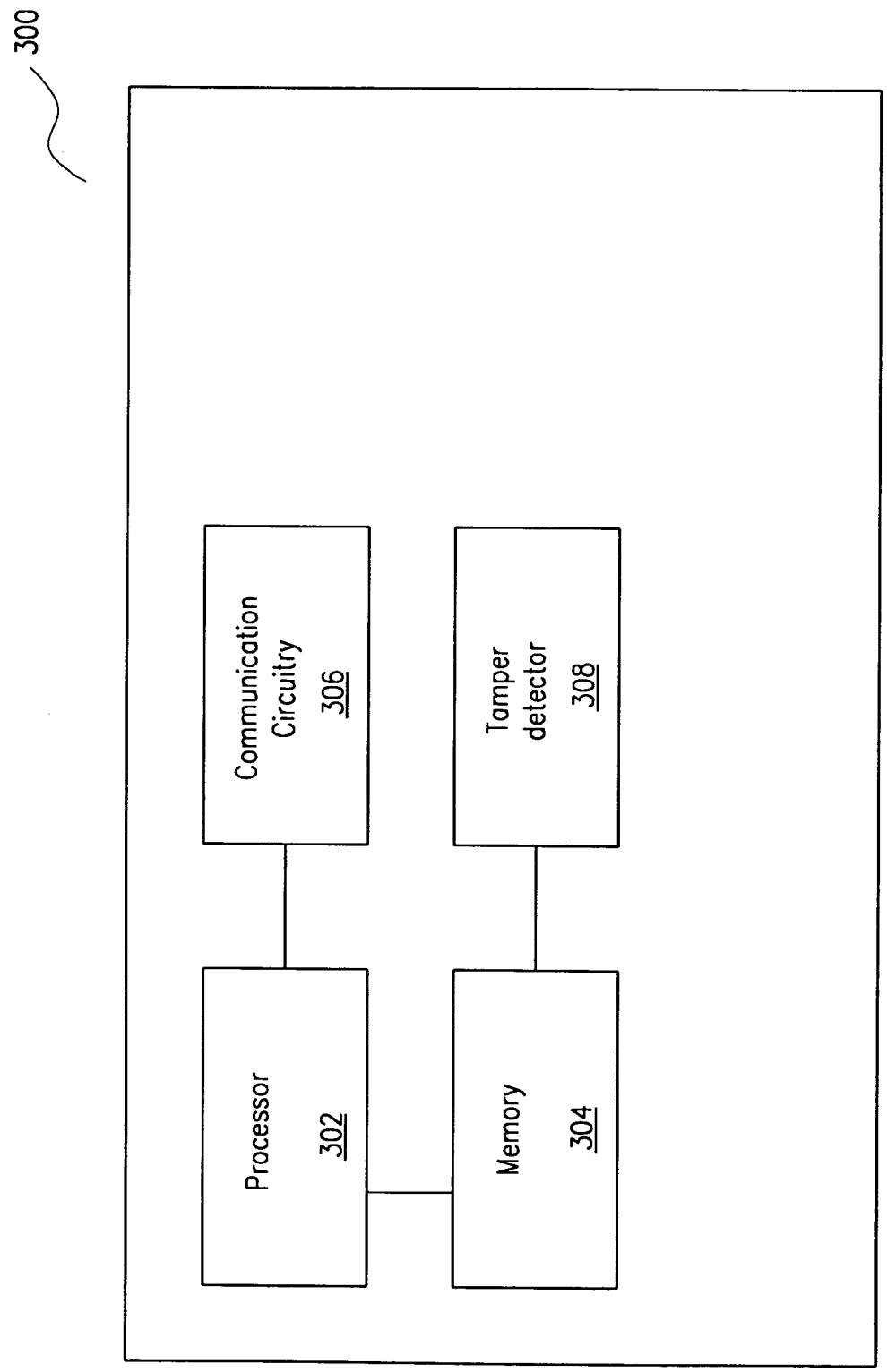
FIG. 3A is a schematic of the components of a roaming security device.

Referring now to FIG. 3A, there is illustrated a schematic of the components of a roaming security device 300 such as roaming security device 105 shown in FIG. 1. In this embodiment, the roaming security device 300 includes a processor 302 connected both to a memory component 304 and to communication circuitry 306. The processor 302 is configured to perform a variety of transactions including hash and/or encryption computations. Additionally, the memory component is configured to store transaction data, device ID numbers, device secrets, and other information and to provide at least part of that data to the processor 302 for any computations. In one embodiment, the memory also is connected to tamper detector circuitry 308 that can destroy the contents of the memory component 304 if it is probed or otherwise accessed in an unauthorized way. Moreover, in the preferred embodiment, the memory component 304 is a nonvolatile, unalterable memory component, such as a lasered memory.

Figure 3B:
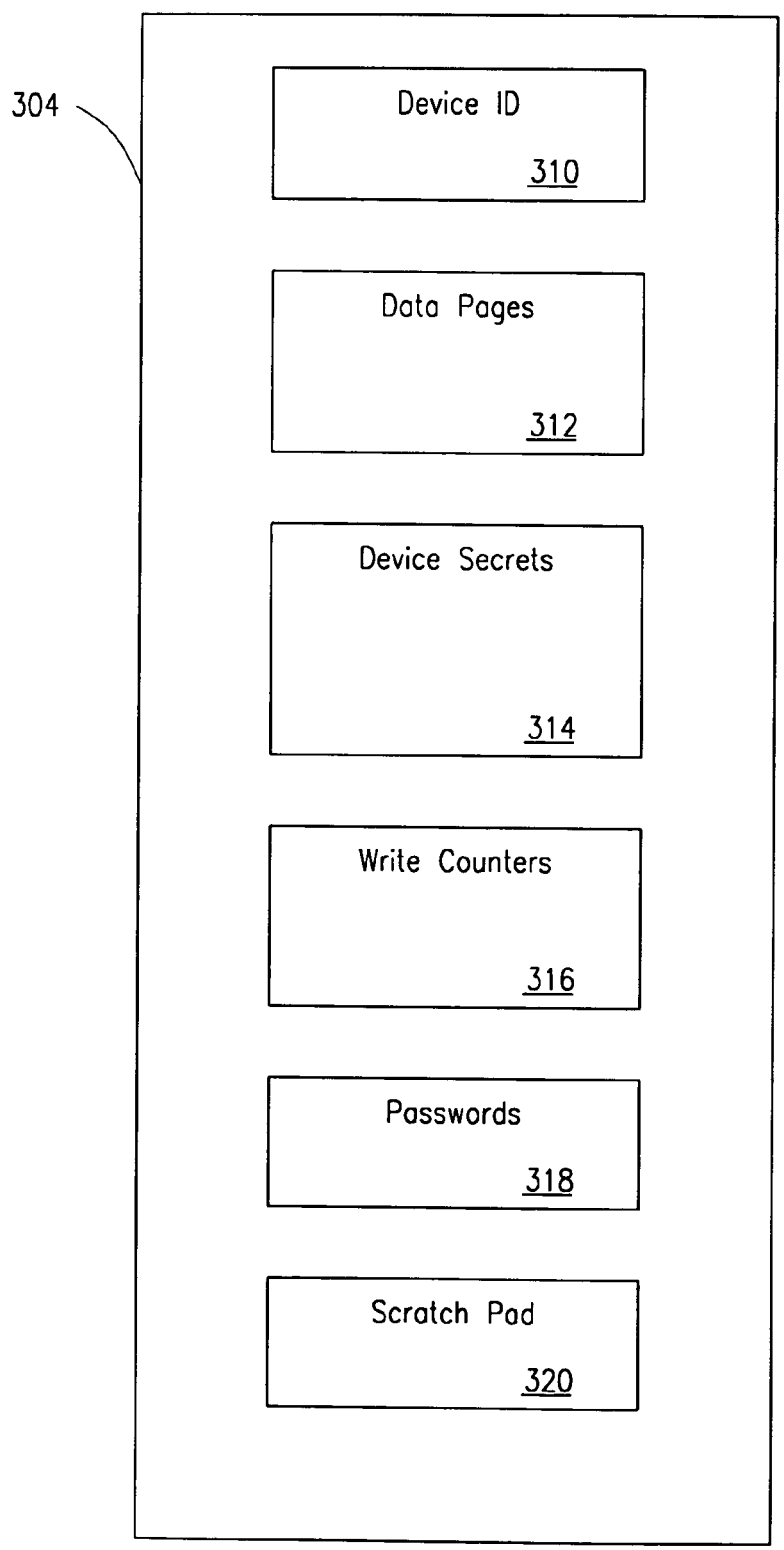
FIG. 3B illustrates one embodiment of the memory component of the roaming security device shown in FIG. 3A.

Referring now to FIG. 3B, there is illustrated one embodiment of the memory component 304 shown in FIG. 3A. The memory component 304 can consist of volatile and/or nonvolatile portions. The nonvolatile portions, which can be lasered for example, can store a device ID 310 including at least one of a unique serial number, a device type identifier, a device model, etc. Other portions of the memory component can be divided to store data pages, device secrets, write counters, passwords, and/or a scratchpad.

The data page portion 312 of the memory, for example, can be configured as a single data page or as multiple data pages (shown in FIG. 3C as data pages 0–6). These data pages can store a variety of information including monetary balances, copy counts, expiration data, trip data, security clearances, access information, inventory IDs, etc. Additionally, if the memory is divided into multiple data pages, each data page can be associated with a different service provider. That is, company A can use a first data page and company B can use a second data page.

Figure 3D:
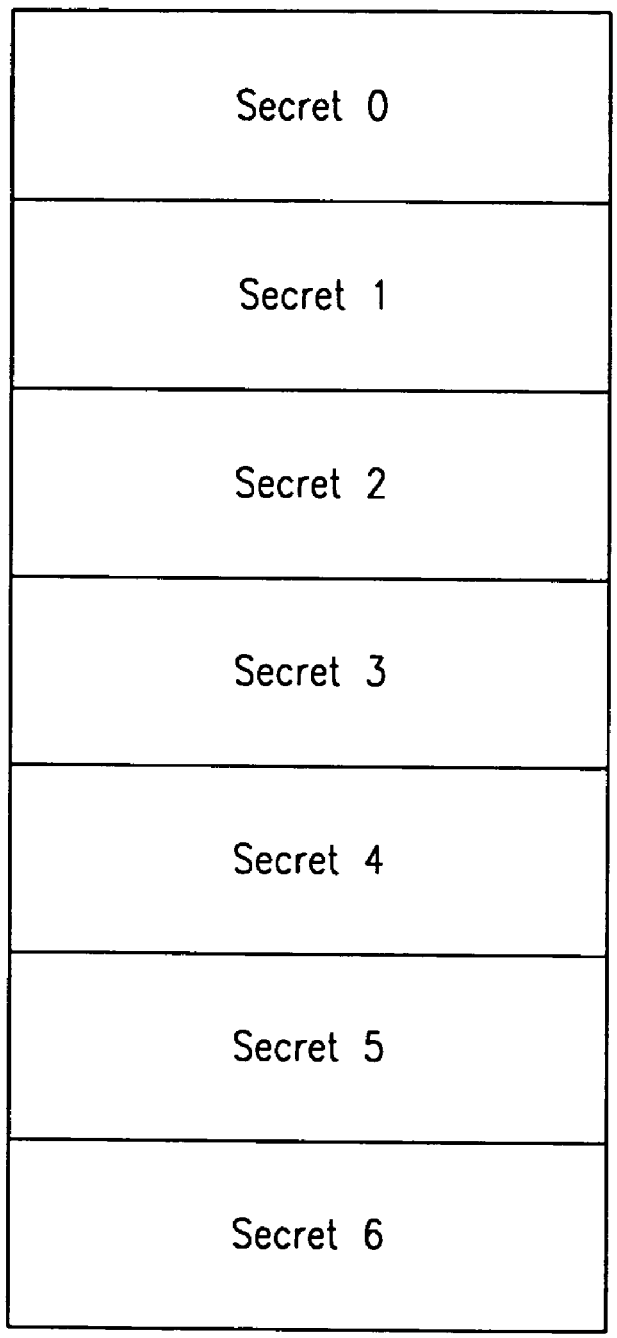
FIG. 3D illustrates one embodiment of the device secrets portion of the memory component shown in FIG. 3B.

Similarly, the device secret portion 314 of the memory component 304 can be divided to store one or more secrets for each service provider such that the various service providers are not forced to share their secrets with each other. For example, FIG. 3D illustrates the device secret portion 314 of the memory component 304 wherein it is configured to store seven different secrets. Each secret can correspond to a particular data page (shown in FIG. 3C) and to a particular service provider. Further, the device secrets stored in the various secret portions can be complete or partial. When partial secrets are used, each piece of the secret can be loaded by a different person at a different time so that the entire secret is never known by any one person and is never known outside the security device. After the first partial secret is loaded, each subsequent partial secret is combined, through, for example, a SHA-1 computation, with the previously computed secret to thereby form a new secret. For example, assume that two partial secrets are used in a roaming security device. The first secret would be loaded and stored at a location such as Secret 3 shown in FIG. 3D. Next, the second partial secret could be loaded. The second partial secret and the first partial secret are used to seed a non-reversible algorithm. The result of this algorithm is stored in location Secret 3 as the master secret. This result can then be used in combination with a unique device identifier to seed a nonreversible algorithm—the output of which is the device secret and is stored in the location Secret 3.

Referring again to the memory component 304 illustrated in FIG. 3B, it can also include write counters 316. These write counters 316 are tamper proof counters that are incremented each time that a data page is altered or each time that a device secret is changed. In one embodiment, individual counters are associated with each data page and each secret. Similarly, individual passwords 318 can be stored for each service provider (i.e., passwords can be associated with each data page). These passwords can be preloaded and stored in nonvolatile memory or alternately loaded by the user and stored in either nonvolatile or volatile memory.

Still referring to FIG. 3B, the memory component 304 also can include a scratchpad memory 320. One scratchpad memory 320 that could be used is described in commonly owned U.S. Pat. No. 5,306,961, Low-power integrated circuit with selectable battery modes, which is incorporated herein by reference. Briefly, however, the scratchpad memory 320 is used to guarantee that transactions between security devices are performed in an atomic fashion, thereby preventing incomplete transactions from being recorded.

Figure 4:
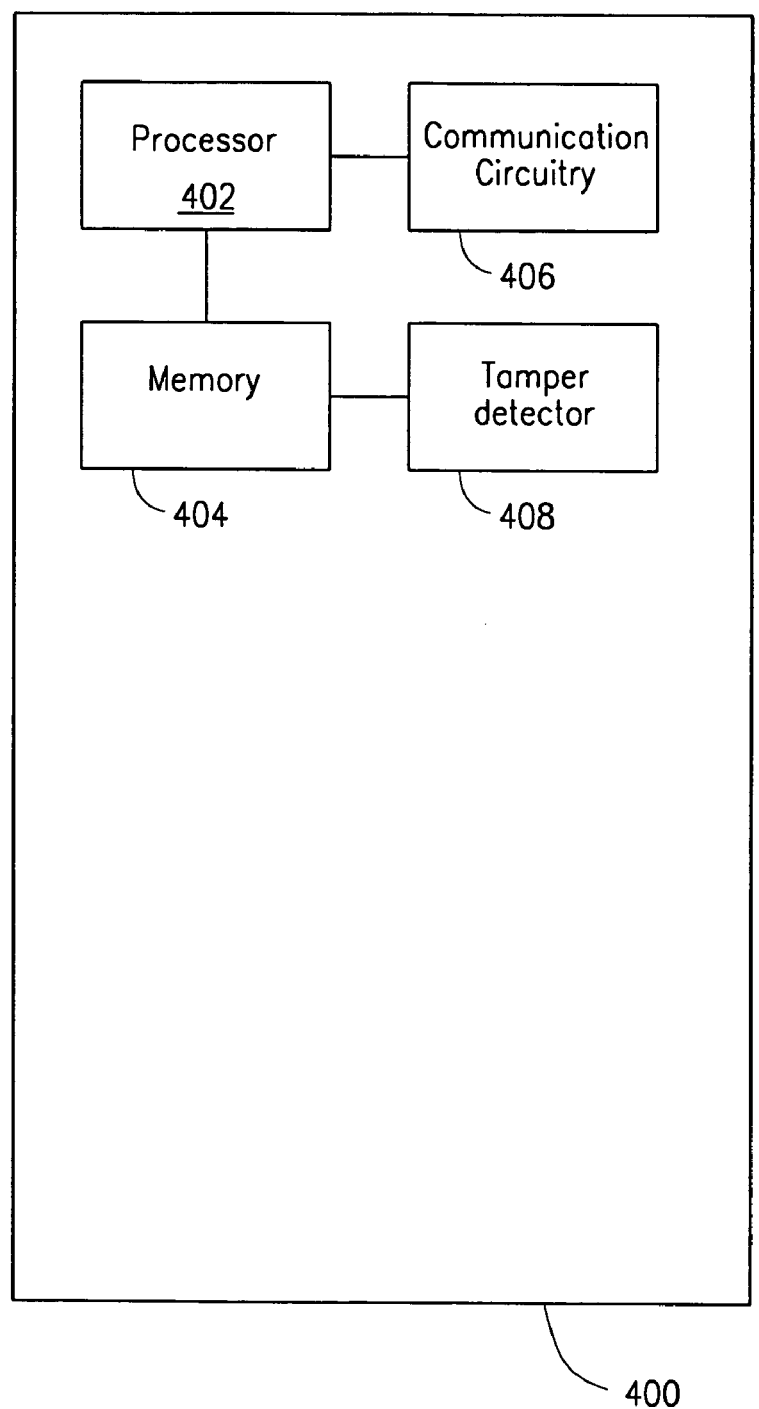
FIG. 4 is a schematic of the components of a coprocessor security device.

Referring now to FIG. 4, there is illustrated a schematic of the components of a coprocessor security device 400 such as coprocessor security device 120. This embodiment of the security device is very similar to the roaming security device shown in FIG. 3. By designing the coprocessor security device and the roaming security device similarly, substantial cost savings can be realized. For example, the coprocessor security device 400 includes a processor 402, a memory 404, communication circuitry 406, and a tamper detector 408. One skilled in the art, however, can understand that the coprocessor security device 400 can take on various forms and could include more or less components than are illustrated and described herein while still performing substantially the same.

Figure 5:
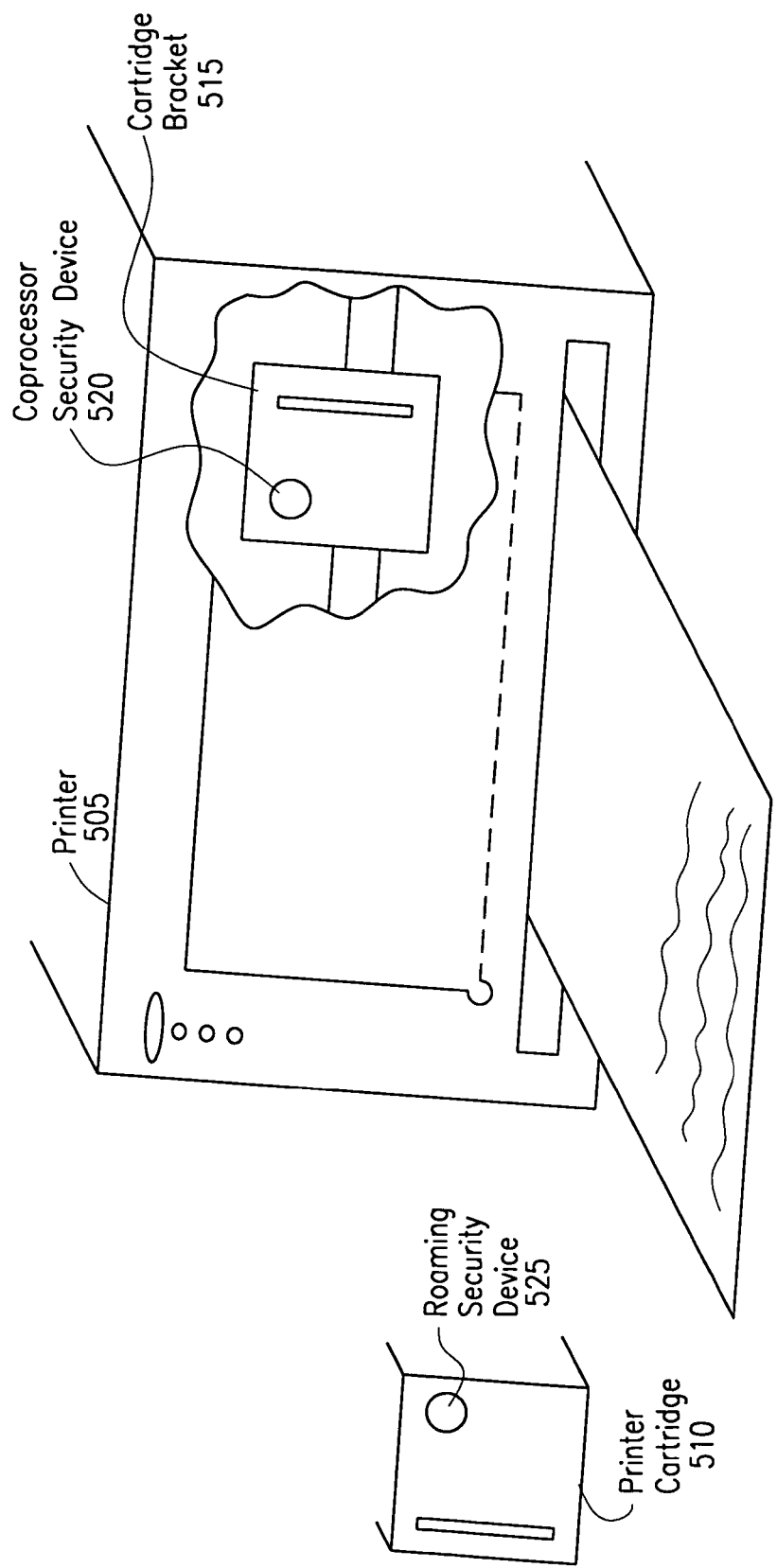
FIG. 5 illustrates a roaming security device and a coprocessor security device incorporated into a printer and printer cartridge.

Referring now to FIG. 5, there is illustrated a roaming security device and a coprocessor security device as they could be incorporated into a printer 505 and a printer cartridge 510. By incorporating the security devices into both the printer 505 and the printer cartridge 510, the printer 505 can verify that the printer cartridge 510 being used in the printer 505 is of the proper type, brand, age, etc. For example, the printer cartridge 510 can be secured to the cartridge bracket 515 so that the cartridge security device 525 contacts the printer security device 520. The printer security device 520 can periodically check to see if the cartridge security device 525 knows the proper secret. That is, the printer security device 520 can verify that the printer cartridge 510 is of the proper specifications. If the printer security device 520 determines that the printer cartridge 510 is not of the proper specifications, then the printer 505 may be disabled until a proper printer cartridge having the proper authentication is installed.

In one embodiment, the printer security device 520 increments a counter in the cartridge security device 525 each time that the printer prints a page (or other measurement). Alternatively, the printer security device 520 writes a page count to the cartridge security device 525 every time that a page is printed. The cartridge security device 525 may also store a maximum page count (i.e., the maximum number of pages that the print cartridge 510 can print). Once the page count counter in the cartridge security device 525 equals or exceeds the maximum page count, the printer 505 can be disabled until a new properly authenticated printer cartridge is installed.

Figure 6A:
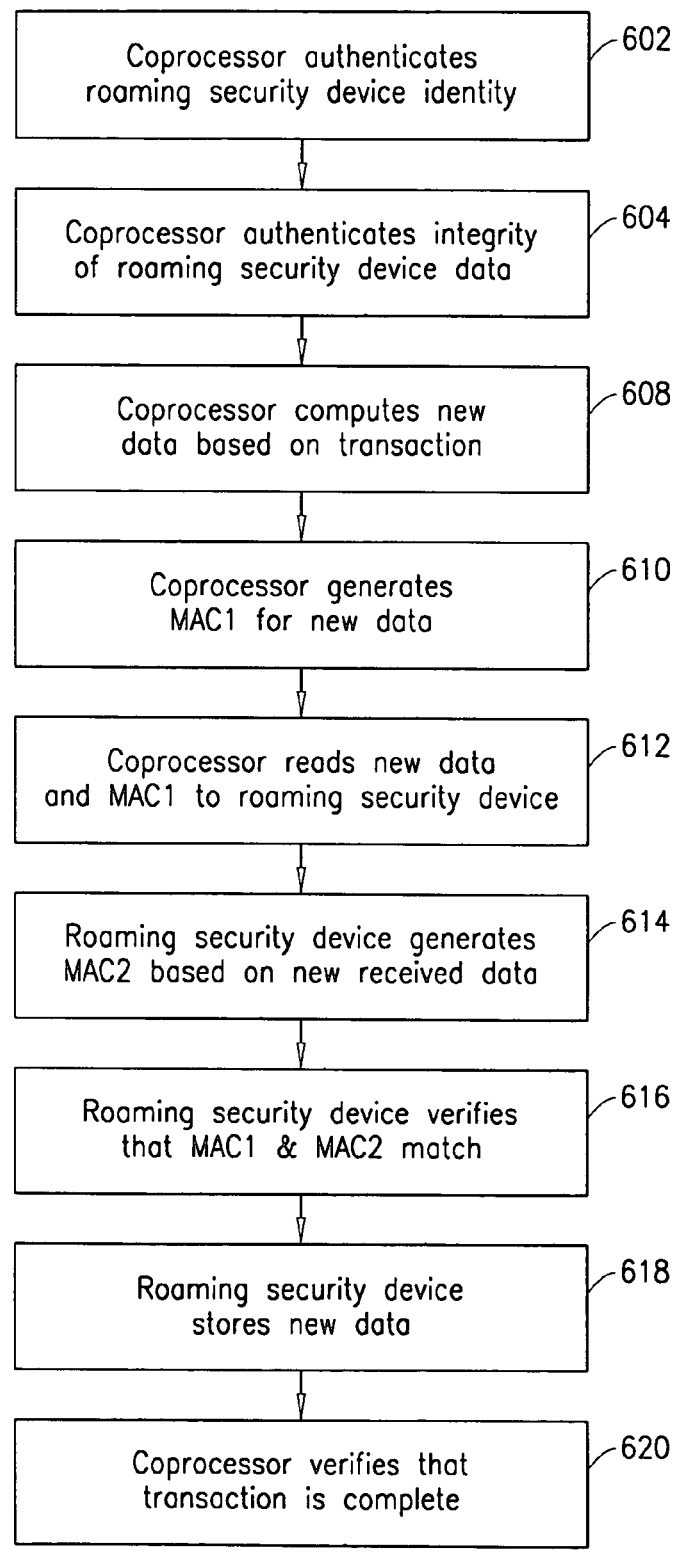
FIG. 6A is a flowchart demonstrating a transaction between a roaming security device and a coprocessor security device.

Referring now to FIG. 6A, there is illustrated a flowchart demonstrating a transaction between a roaming security device (e.g., the cartridge security device 525) and a coprocessor security device (e.g., the printer security device 520). In this embodiment, the coprocessor security device initially authenticates the roaming security device's identity (step 602). Next (although sequence is not necessarily important), the coprocessor security device—although not always necessary—can authenticate the integrity of the data stored in the roaming security device (step 604). In some embodiments, the roaming security device can also authenticate the coprocessor security device before allowing the coprocessor security device to write data to the roaming security device.

Next, the coprocessor security device computes new data based upon the transaction (step 608). For example, the coprocessor security device may deduct the fee for a snack from the monetary amount stored on the roaming security device. (This computation alternatively can be done in the roaming security device.) The coprocessor security device then generates a Message Authentication Code (MAC) (this particular MAC is referred to as MAC1) using the new data (step 610). MAC1 and the new data are transmitted to the roaming security device (step 612) where the new data is used to generate a second MAC (MAC2) (step 614). The roaming security device then compares MAC1 with MAC2 (step 616). If they match, then the data is stored in the roaming security device (step 618). Otherwise, the transactions can be voided and reexecuted. Assuming that the MACs match the coprocessor verifies that the data was properly written to and stored in the roaming security device (step 620).

Figure 6B:
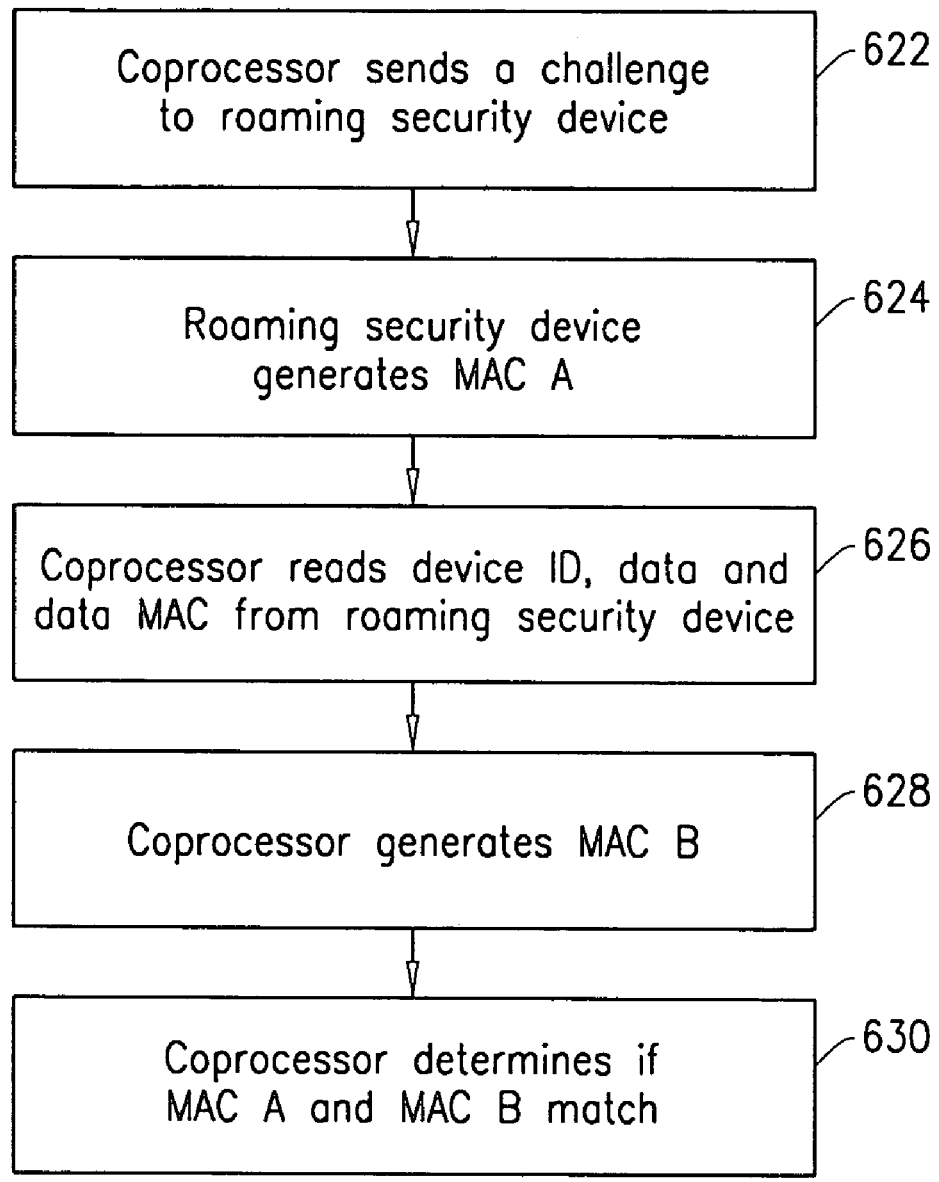
FIG. 6B is a flowchart demonstrating in more detail the method of security device authentication shown in FIG. 6A.

Referring now to FIG. 6B, it is a flowchart demonstrating in more detail the method of security device authentication shown in FIG. 6A as step 602. Initially, the coprocessor security device generates and sends a challenge (e.g., a random number) to the roaming security device (step 622). The roaming security device generates a MAC (MAC A) using at least one of the challenge, the roaming security device ID, the device secret associated with the relevant service provider, a counter value, and other relevant data stored locally (step 624). MAC A is then transmitted to the coprocessor security device. At roughly the same time, the coprocessor security device reads the roaming security device ID and the other data from the roaming security device (step 626). This data, in combination with the device secret stored in the coprocessor security device, is used to generate a MAC (MAC B) (step 628). (Note that the device secret is not transferred directly between the security devices and thus never exposed). The coprocessor security device then compares MAC A with MAC B (step 630). If MAC A and MAC B match, then the identity of the roaming device is authenticated. As can be appreciated, however, the method shown in FIG. 6B, can easily be adapted so that the roaming security device can authenticate the coprocessor security device instead of the coprocessor security device authenticating the roaming security device.

Figure 6C:
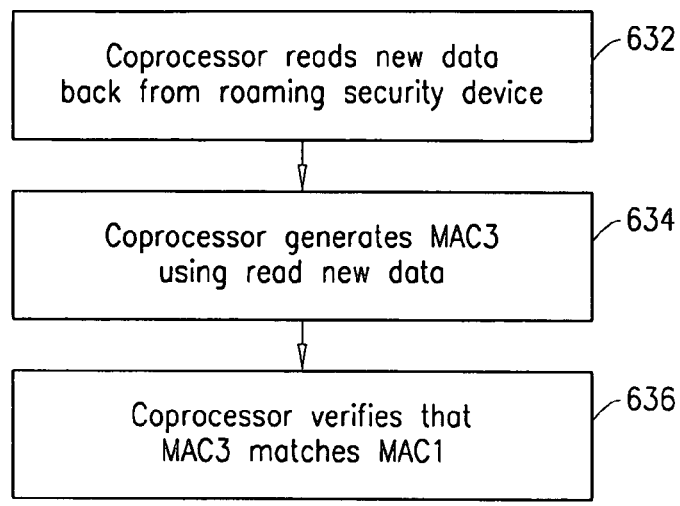
FIG. 6C is a flowchart demonstrating in more detail the method of verifying the completion of the transaction illustrated in FIG. 6A.

Referring now to FIG. 6C, it is a flowchart demonstrating in more detail step 620 shown in FIG. 6A in which the completion of the transaction is verified. In this embodiment, after the coprocessor security device has written the new data to the roaming security device, the coprocessor security device reads back the new data to verify the integrity of the data (step 632). (The roaming security device can also send MAC2 along with the new data to the coprocessor security device. The coprocessor security device can use the MAC2 to detect tampering.) Although the coprocessor security device can read back the data without any security measures, in the preferred embodiment, the coprocessor security device reads back the data and generates a new MAC (MAC3) using the read-back data (step 634). If MAC3 matches the previously generated MAC1, then the data in the roaming security device was properly recorded (step 636). Otherwise, the data may be corrupt, thereby requiring the roaming security device to be deactivated or the transaction to be reexecuted.

In other embodiments, additional data is transferred between the roaming security device and the coprocessor security device. For example, at the completion of a transaction, a write counter in the roaming security device (shown in FIG. 3B) can be incremented and the coprocessor security device can verify that the write counter holds the proper transaction count. Additionally, an identifier associated with the coprocessor security device can be stored at the roaming security device. That is, the roaming security device can store not only the transaction results but also an identifier (e.g., device ID) for the coprocessor security device that conducted the transaction.

In yet another embodiment, the roaming security device can store access information, such as which buildings were accessed using the roaming security device. Alternatively, the coprocessor security device can store information such as who accessed a building. As can be understood by those of skill in the art, both the coprocessor security device and the roaming security device can be configured to store any type of information that would be useful.

Figure 6D:
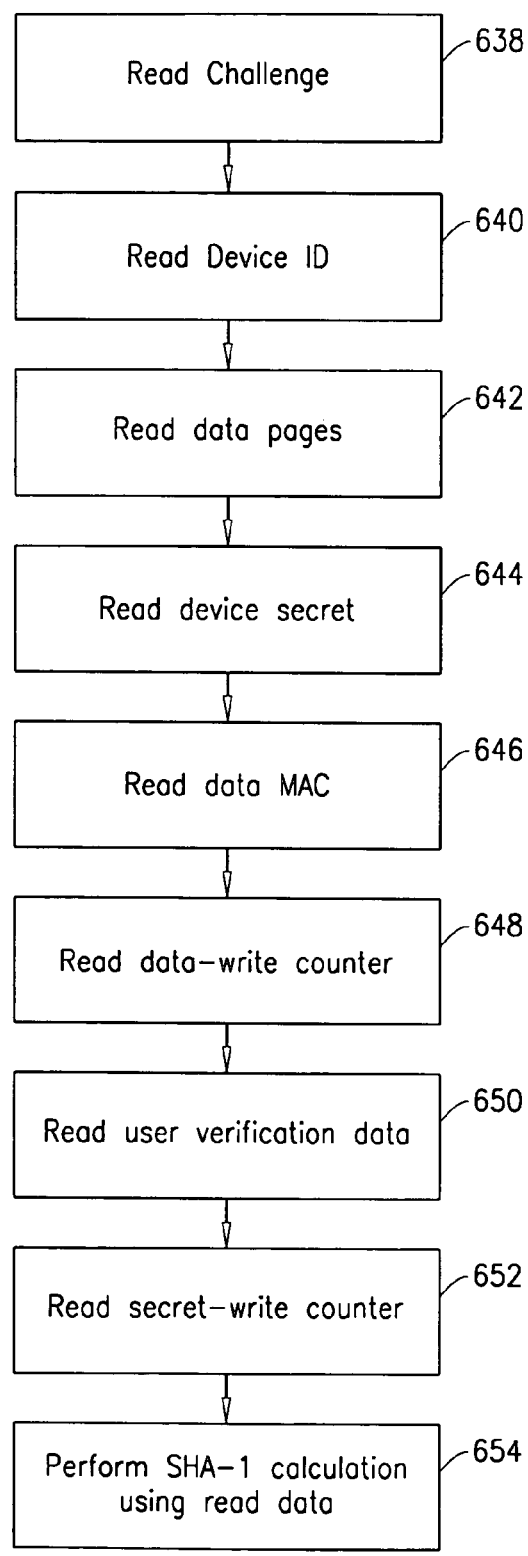
FIG. 6D is a flowchart demonstrating a method of generating a hash result used, for example, in the transaction illustrated in FIG. 6A.

Referring now to FIG. 6D, it is a flowchart demonstrating a method of generating a hash result such as MAC A used in the transaction of FIG. 6A. Initially, the coprocessor security device generates and sends a challenge (e.g., a random number) to the roaming security device (step 638). The roaming security device reads at least one of its unique device ID (step 640), the appropriate data page (step 642), secret (step 644), data MAC (step 646), data write counter (step 648), user verification data (step 650), and secret write counter (step 652). This data is then used to seed a nonreversible hashing algorithm such as the SHA-1 algorithm (step 654).

Figure 7:
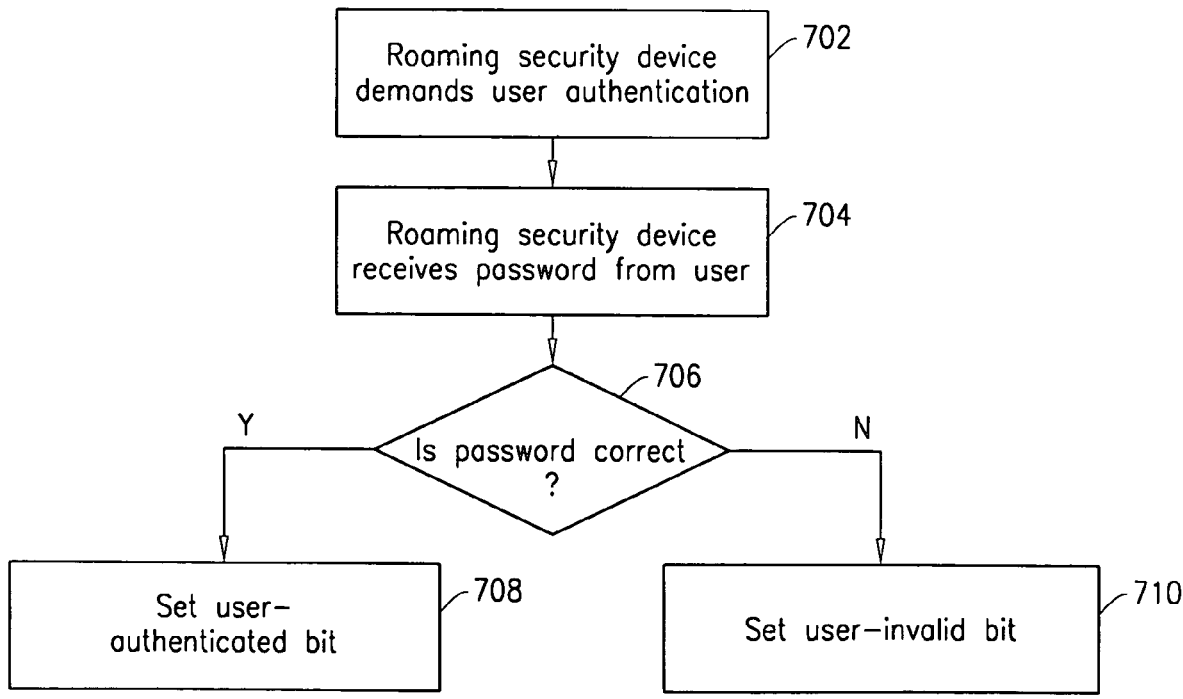
FIG. 7 is a flowchart demonstrating a method of verifying the identity of a user to a security device.

Referring now to FIG. 7, it is a flowchart demonstrating a method of user verification. User verification further increases the security provided by the roaming/coprocessor security devices by requiring that the user as well as the security device be authenticated. In one embodiment, the roaming security device demands that the user authenticate himself by entering a password (step 702). The roaming security device can be prompted to make this demand by a coprocessor security device or any other device.

In response to the demand, the user should enter a password (step 704). Once entered, the password (possibly in an encrypted form or with a MAC) is sent to the roaming security device and verified (step 706). If the password is correct, a bit in the user verification data can be flipped (step 708). If the password is incorrect, another bit can be set to indicate an invalid user (step 710). The roaming security device can incorporate these bits into any generated MAC so that the coprocessor security device can be properly informed of the user's status.

Figure 8:
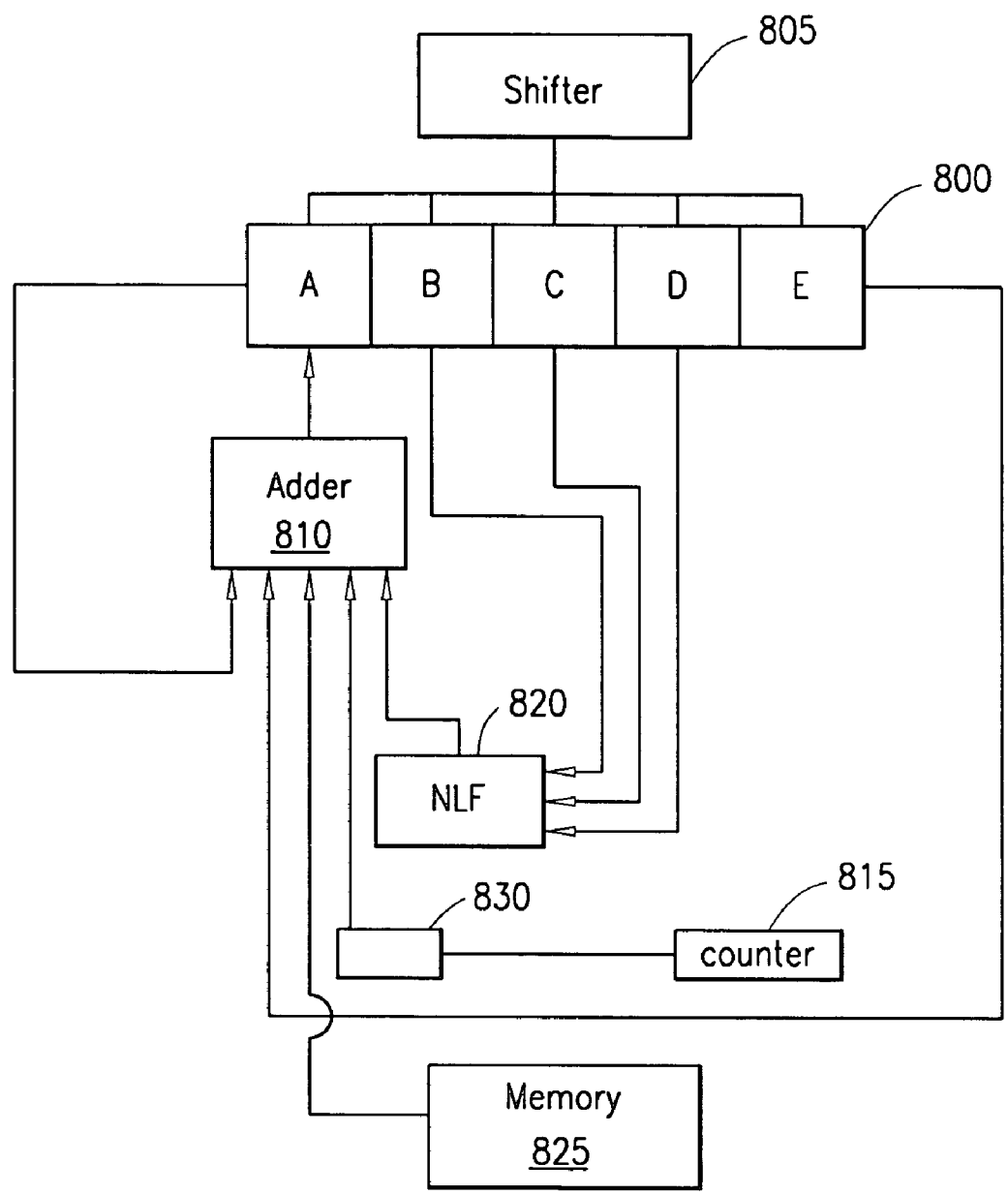
FIG. 8 is a block diagram of a device for computing a SHA-1 computation.

Now referring to FIG. 8, it is a block diagram of a device for computing a SHA-1 computation. This embodiment includes five 32-bit registers 800, (labeled A–E); a barrel shifter 805; a 5-way 32-bit parallel adder 810; a counter 815; a 32-bit-wide logic function generator 820, (referred to as NLF); 16 32-bit memory elements 825, and a input number generator 830.

In operation, registers A–E are initialized and the memory 825 is loaded with the seed. The SHA-1 computation is computed with 80 cycles of shifts and additions. In a typical cycle, for example, the value of register A is shifted to register B, the value of register B is shifted to register C, the value of register C is shifted to register D, the value of register D is shifted to register E, and the output of adder 810 is loaded into register A.

To load a new value into register A every cycle, the adder 810 adds, in parallel, the value of register A, the value of register E, an input from the memory element 825, an input from the input number generator 830, and an input from the NLF 820. (The NLF receives the values of registers B, C, and D and performs a non-linear function thereon to generate the output.)

In conclusion, those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method of device authentication, the method comprising:
   receiving, at a printer cartridge comprising a roaming device, a challenge from a host printer device;
   generating, at the printer cartridge comprising the roaming device, a first nonreversible computation result, wherein the first nonreversible computation result is computed by seeding a first nonreversible algorithm with at least the challenge, and a roaming device secret;
   outputting to the host printer device a response to the challenge, wherein the outputted response includes the first nonreversible computation result,
   outputting to the host an identification and at least another data item;
   generating, at the host printer device a second nonreversible computation result, wherein the second nonreversible computation result is computed by seeding a second nonreversible algorithm with at least a challenge and a host printer device secret;
   comparing, by said host printer device, said fast nonreversible computation and said second nonreversible computation in order to authenticate the printer cartridge comprising the roaming device;
   allowing said host printer device to print documents if said printer cartridge comprising said roaming device is authenticated.

2. The method of claim 1, further comprising:
   enabling said printer cartridge to operate responsive to a positive authentication of the roaming device.

3. The method of claim 1, further comprising:
   disabling said host printer device responsive to a failure to authenticate the roaming device.

4. The method of claim 1, wherein the first nonreversible computation result is computed by further seeding the first nonreversible algorithm with a unique device identifier.

5. A host system device and subsystem device combination comprising:
   a host security circuit, said host security circuit comprising:
      at least one locally stored secret, seed data;
      a host processor for performing a non-reversible device authentication algorithm; and means for reading data from a subsystem device;

a roaming security device as part of said subsystem device, said roaming security device comprising:

a subsystem processor for performing non-reversible computations;

a memory component, connected to said subsystem processor, said memory circuit comprising at least one secret;

a communication circuit, connected to said subsystem processor, for communicating with said host security circuit;

said subsystem device being removably attached to said host system device, said host system being a printer and being inoperable for printing without being attached to said subsystem device.

6. The host system device and subsystem device combination of claim 5, wherein said host security circuit sends a challenge to said roaming security device and said roaming security device provides a first response to said challenge, using said at least one secret, to said host security circuit.

7. The host system device and subsystem device combination of claim 6, wherein said host security circuit reads said first response from said roaming security device and said host security circuit compares said first response with a first result of said non-reversible device authentication algorithm to determine if said first response and said first result match.

8. The host system device and subsystem device combination of claim 5, wherein said roaming security device authenticates said host security circuit while the host security circuit authenticates said roaming security device.

9. The host system device and subsystem device combination of claim 5, wherein said subsystem device is a printer cartridge.

10. The host system device and subsystem device combination of claim 5, wherein said host security circuit periodically checks the authenticity of said roaming security device.

11. The host system device and subsystem device combination of claim 5, wherein communication data is encrypted prior to communication between said host system device and said subsystem device.

12. The host system device and subsystem device combination of claim 5, wherein an attempt to physically access the circuitry of the roaming security device results in the destruction of data stored in said roaming security device.

13. The host system device and subsystem device combination of claim 5, wherein said subsystem device further comprises a battery for at least partially powering said roaming security device.

14. The host system device and subsystem device combination of claim 5, wherein said at least one locally stored secret is never communicated to said subsystem device.

15. The host system device and subsystem device combination of claim 5, wherein said at least one secret is never communicated to said host device.

16. The host system device and subsystem device combination of claim 5, wherein said nonreversible device authentication algorithm is a SHA-1 algorithm.

17. The host system device and subsystem device combination of claim 5, wherein said host security circuit communicates with said subsystem device to authenticate said subsystem device and to determine at least one of whether said subsystem device is the proper type, brand, or age.

18. The host system device and subsystem device combination of claim 17, wherein said host system is disabled if said subsystem device cannot be authenticated.

19. The host system device and subsystem device combination of claim 5, wherein said subsystem device is a consumable device.

20. A subsystem device comprising:

a replaceable subsystem that operationally completes a host system, said host system being a printer device;

a security device being a part of said replaceable subsystem, said security device comprising:

a first memory portion configured to store a device ID;

a second memory portion configured to store at least one device secret;

a processor connected to said first and second memory portions, the processor configured to read the stored device ID from the first memory portion, the at least one stored device secret from the second memory portion and to perform a nonreversible computation using the device ID, the at least one device secret and a challenge as seeds; and a communication circuit connected to the processor, said communication circuit configured to receive the challenge from a host device and to communicate a result of the nonreversible computation, performed by the processor, back to the host for authentication of said replaceable subsystem.

21. The subsystem device of claim 20, wherein said host device is disabled until a replaceable subsystem is installed and authenticated.

22. The subsystem device of claim 20 wherein said subsystem is a consumable device.

23. The subsystem of claim 20, wherein said subsystem is a printer cartridge.

24. The subsystem of claim 20, wherein said nonreversible computation is a SHA-1 computation.

25. The subsystem of claim 20, wherein said subsystem authenticates said host.

26. The subsystem of claim 20, wherein an attempt to physically access said security device will result in the destruction of said device ID and said at least one device secret.

* * * * *

UNITED STATES PATENT AND TRADEMARK OFFICE
CERTIFICATE OF CORRECTION

PATENT NO. : 6,986,057 B1 Page 1 of 1
APPLICATION NO. : 09/644031
DATED : January 10, 2006
INVENTOR(S) : James P. Cusey et al.

It is certified that error appears in the above-identified patent and that said Letters Patent is hereby corrected as shown below:

Column 8,
Line 45, replace "said fast nonreversible" with -- said first nonreversible --.

Signed and Sealed this

Twenty-seventh Day of June, 2006

JON W. DUDAS
*Director of the United States Patent and Trademark Office*